US006824151B1

(12) United States Patent
Tucei, Jr.

(10) Patent No.: US 6,824,151 B1
(45) Date of Patent: Nov. 30, 2004

(54) FIXTURE FOR TRANSPORTING HELICOPTER BLADES

(76) Inventor: Lawrence P Tucei, Jr., 3604 Suter Rd., Gautier, MS (US) 39553

( * ) Notice: Subject to any disclaimer, the term of this patent is extended or adjusted under 35 U.S.C. 154(b) by 135 days.

(21) Appl. No.: 10/299,346

(22) Filed: Nov. 19, 2002

Related U.S. Application Data

(60) Provisional application No. 60/336,092, filed on Dec. 1, 2001.

(51) Int. Cl.[7] .................................................. B62B 5/00
(52) U.S. Cl. ................. 280/79.11; 280/79.3; 280/47.35
(58) Field of Search ........................... 280/47.34, 47.35, 280/79.11, 79.3, 79.6, 79.7

(56) References Cited

U.S. PATENT DOCUMENTS

| | | | | |
|---|---|---|---|---|
| 1,930,078 A | * | 10/1933 | Bentley et al. ........... | 280/47.16 |
| 2,999,693 A | * | 9/1961 | Thorson ...................... | 410/42 |
| 3,351,207 A | * | 11/1967 | Meek .......................... | 211/13.1 |
| 3,659,892 A | * | 5/1972 | Briggs ......................... | 410/46 |
| 4,056,220 A | * | 11/1977 | Trimble ..................... | 224/406 |
| 4,362,459 A | * | 12/1982 | Klausbruckner et al. ..... | 414/584 |
| 6,663,139 B1 | * | 12/2003 | Smith ......................... | 280/651 |

* cited by examiner

Primary Examiner—Bryan Fischmann
Assistant Examiner—Brian Swenson
(74) Attorney, Agent, or Firm—Donald J. Ersler

(57) ABSTRACT

A fixture for transporting helicopter blades preferably includes a base, at least two retaining plates, and at least four casters. The base preferably includes two side members, two end members, and at least one cross member. Each retaining plate preferably includes at least one stabilator slot, at least four rotor blade slots, and at least two tail rotor blade slots. Each slot preferably includes a flange member which extends beyond the thickness of the retaining member. A nonabrasive material or nonabrasive coating is applied to an inside surface of each flange member to prevent damage to the helicopter blades.

14 Claims, 4 Drawing Sheets

FIXTURE FOR TRANSPORTING HELICOPTER BLADES

CROSS-REFERENCES TO RELATED APPLICATIONS

This is a utility patent application, taking priority from provisional patent application, serial No. 60/336,092 filed on Dec. 1, 2001.

BACKGROUND OF THE INVENTION

1. Field of the Invention

The present invention relates generally to helicopter blades and more specifically to a fixture for transporting helicopter blades.

2. Discussion of the Prior Art

There appears to be no commercially available device for storing and transporting helicopter blades after they have been removed from a helicopter. The helicopter blades must be periodically removed from the rotor head of the helicopter for inspection of the rotor head and associated equipment. Typically, the helicopter blades are just placed on the ground near the helicopter. The helicopter blades on the ground may become damaged, if someone is careless.

Accordingly, there is a clearly felt need in the art for a fixture for transporting helicopter blades which allows a set of helicopter blades to be stored and transported.

SUMMARY OF THE INVENTION

The present invention provides a fixture for transporting helicopter blades which is capable of temporarily retaining a set of helicopter blades. The fixture for transporting helicopter blades includes a base, at least two retaining plates, and a means for moving the base. The means for moving the base is preferably at least four casters, but other devices may also be used. The base preferably includes two side members, two end members, and at least one cross member. Each retaining plate preferably includes at least one stabilator slot, at least four rotor blade slots, and at least two tail rotor blade slots. Each slot preferably includes a flange member which extends beyond the thickness of the retaining plate. A nonabrasive material is attached to an inside surface of each flange member or an inside surface of each flange member is coated with a nonabrasive material to prevent damage to the helicopter blades.

Accordingly, it is an object of the present invention to provide a fixture for transporting helicopter blades, which will not damage a set of helicopter blades.

It is another object of the present invention to provide a fixture for transporting helicopter blades, which may be used to temporarily store a set of helicopter blades.

Finally, it is another object of the present invention to provide a fixture for transporting helicopter blades, which may be used to transport a set of helicopter blades.

These and additional objects, advantages, features and benefits of the present invention will become apparent from the following specification.

DETAILED DESCRIPTION OF THE PREFERRED EMBODIMENTS

Figure 1:
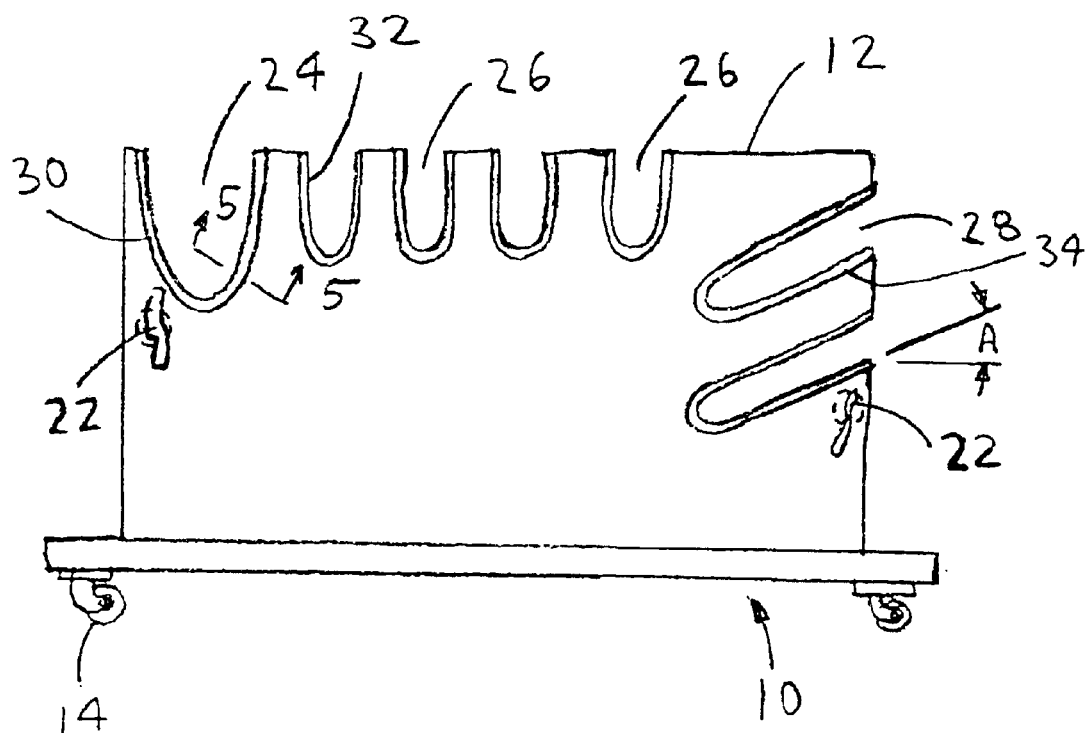
FIG. 1 is an end view of a fixture for transporting helicopter blades in accordance with the present invention.
Figure 2:
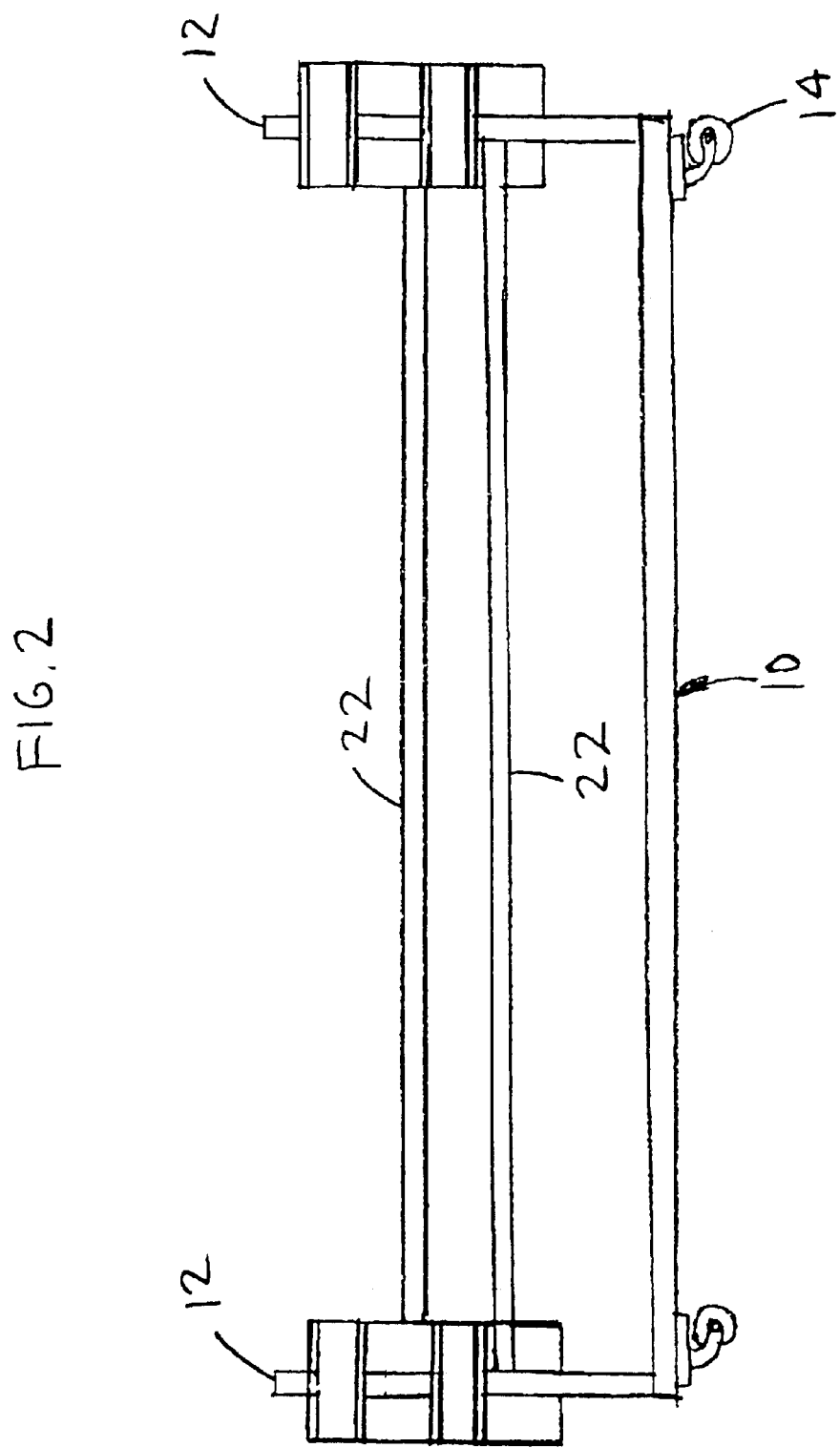
FIG. 2 is a front view of a fixture for transporting helicopter blades in accordance with the present invention.
Figure 3:
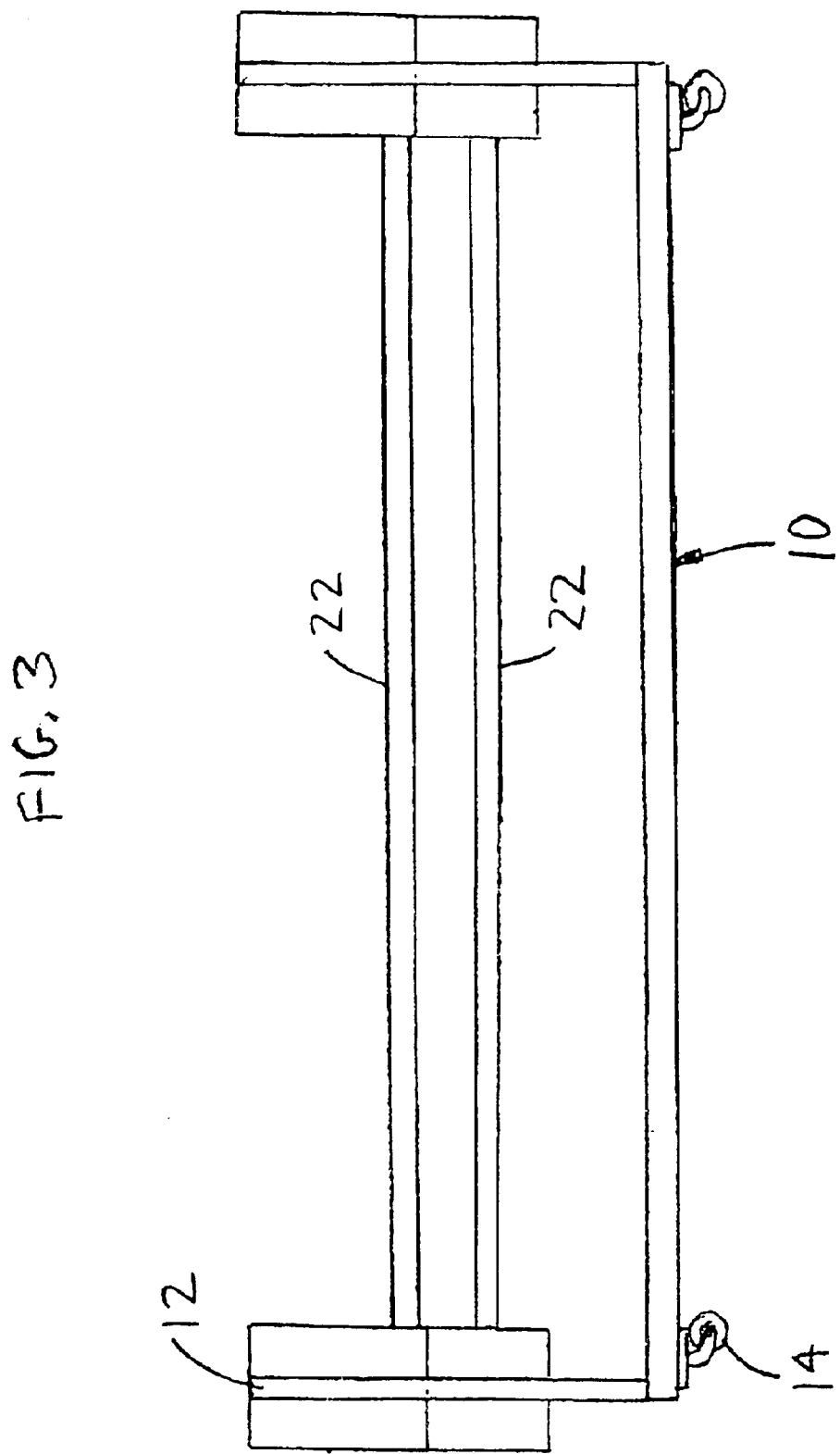
FIG. 3 is a rear view of a fixture for transporting helicopter blades in accordance with the present invention.
Figure 4:
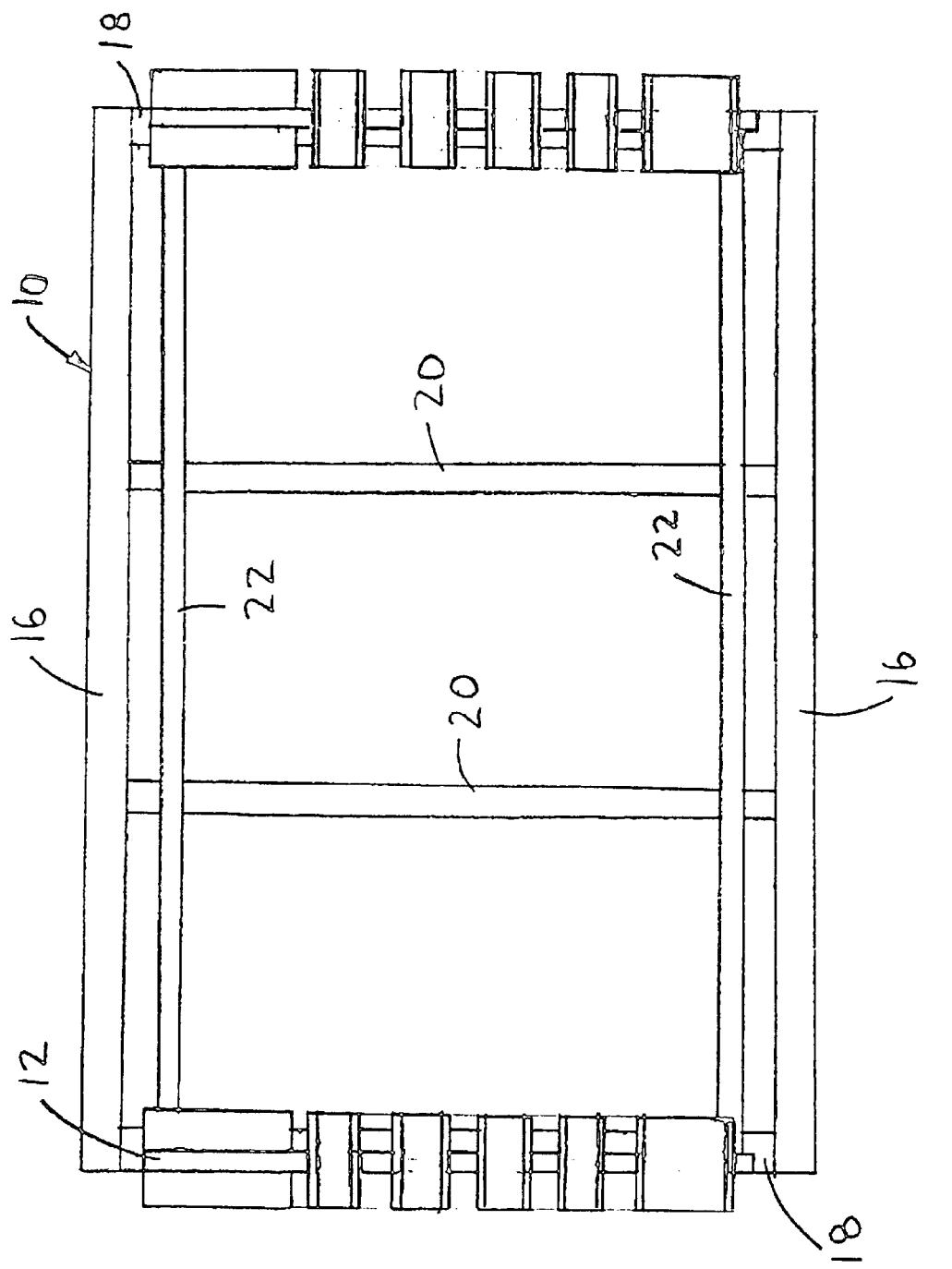
FIG. 4 is a top view of a fixture for transporting helicopter blades in accordance with the present invention.

With reference now to the drawings, and particularly to FIG. 1, there is shown an end view of a fixture for transporting helicopter blades 1. With reference to FIGS. 2–4, the fixture for transporting helicopter blades 1 includes a base 10, at least two retaining plates 12 and a means for moving the base. The means for moving the base is preferably at least four casters 14, but other devices may also be used. The at least two retaining plates 12 are preferably attached to the base 10 at opposing ends thereof by a fusing operation (such as welding), but other attachment methods may be used such as fasteners. The at least four casters 14 are attached to a bottom of the base 10, preferably at each corner thereof. The base 10 preferably includes two side members 16, two end members 18, and at least one cross member 20. The members are preferably attached to each other with a fusing operation (such as welding), but other attachment methods may also be used, such as fasteners. The at least four casters 14 must be strong enough to support the weight of the helicopter blades and the fixture for transporting helicopter blades 1. At least one lengthwise member 22 is preferably inserted and fused between the at least two retaining plates 12 to provide stability to the fixture for transporting helicopter blades 1.

Each retaining plate 12 preferably includes at least one stabilator slot 24, at least four rotor slots 26, and at least two tail rotor slots 28. The at least one stabilator slot 24 and the at least four rotor blade slots 26 are preferably formed in a top of the at least two retaining plates 12 and the two tail rotor slots 28 are preferably formed in a side of the at least two retaining plates 12. It is preferable that each tail rotor slot 28 be formed at an acute angle "A" from the horizontal axis. The value of angle "A" is preferably 10–30 degrees, but other values may also be used. A stabilator flange 30 is preferably secured to the stabilator slot 24. A rotor flange 32 is preferably secured to each rotor blade slot 26. A tail rotor flange 34 is preferably secured to each tail rotor blade slot 28. The flanges support a greater surface area of the helicopter blades to prevent damage thereto.

Figure 5:
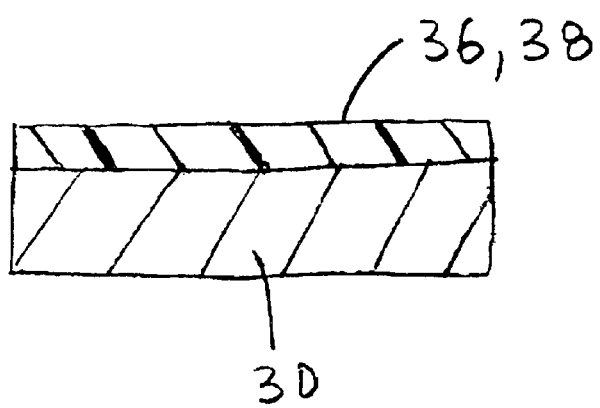
FIG. 5 is a cross sectional view of a flange with nonabrasive material applied to an inside surface thereof in accordance with the present invention.

With reference to FIG. 5, preferably a nonabrasive material 36 such as rubber is attached to an inside surface of each flange with an adhesive or the like. The inside surface of each flange may alternatively be coated with a nonabrasive coating 38. The inside surfaces of the flanges are treated to prevent surface damage to the helicopter blades.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A fixture for transporting helicopter blades comprising:

a base;

at least two retaining plates, one of said at least two retaining plates being attached to said base on one end and a second of said at least two retaining plates being attached to an opposing end of said base, at least one stabilator blade slot, at least four rotor blade slots, and at least two tail rotor blade slots being formed in said at least two retaining plates, a flange being formed in each one of said blade slots; and at least four casters being attached to a bottom of said base.

2. The fixture for transporting helicopter blades of claim 1 wherein:

one of a coating of a nonabrasive material being applied to an inside surface of each said flange and a nonabrasive material being attached to said inside surface of each said flange.

3. The fixture for transporting helicopter blades of claim 1, further comprising:

said base including two side members, two end members, and at least one cross member.

4. The fixture for transporting helicopter blades of claim 1, further comprising:

at least one lengthwise member being attached between the at least two retaining plates.

5. A fixture for transporting helicopter blades comprising:

a base;

at least two retaining plates, one of said at least two retaining plates being attached to said base on one end and a second of said at least two retaining plates being attached to an opposing end of said base, at least one stabilator blade slot, at least four rotor blade slots, and at least two tail rotor blade slots being formed in said at least two retaining plates; and means for moving said base being formed on a bottom of said base.

6. The fixture for transporting helicopter blades of claim 5 wherein:

said means for moving said base being at least four casters.

7. The fixture for transporting helicopter blades of claim 5 further comprising:

a flange being formed in each one of said blade slots to receive a helicopter blade.

8. The fixture for transporting helicopter blades of claim 5 wherein:

one of a coating of a nonabrasive material being applied to an inside surface of each said flange and a nonabrasive material being attached to said inside surface of each said flange.

9. The fixture for transporting helicopter blades of claim 5, further comprising:

said base including two side members, two end members, and at least one cross member.

10. The fixture for transporting helicopter blades of claim 5, further comprising:

at least one lengthwise member being attached between the at least two retaining plates.

11. A fixture for transporting helicopter blades comprising:

a base;

at least two retaining plates, one of said at least two retaining plates being attached to said base on one end and a second of said at least two retaining plates being attached to an opposing end of said base, at least one stabilator blade slot, at least four rotor blade slots, and at least two tail rotor blade slots being formed in said at least two retaining plates, a flange being formed in each one of said blade slots; and means for moving said base being formed on a bottom of said base.

12. The fixture for transporting helicopter blades of claim 11 wherein:

said means for moving said base being at least four casters.

13. The fixture for transporting helicopter blades of claim 11 wherein:

one of a coating of a nonabrasive material being applied to an inside surface of each said flange and a nonabrasive material being attached to said inside surface of each said flange.

14. The fixture for transporting helicopter blades of claim 11, further comprising:

at least one lengthwise member being attached between the at least two retaining plates.

* * * * *